United States Patent
Ur et al.

(10) Patent No.: US 6,779,135 B1
(45) Date of Patent: Aug. 17, 2004

(54) INTERLEAVING BASED COVERAGE MODELS FOR CONCURRENT AND DISTRIBUTED SOFTWARE

(75) Inventors: Shmuel Ur, Shorashim (IL); Eitan Farchi, Hanna (IL)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 09/731,387

(22) Filed: Nov. 30, 2000

Related U.S. Application Data

(60) Provisional application No. 60/201,446, filed on May 3, 2000.

(51) Int. Cl.[7] .............................................. G06F 11/00
(52) U.S. Cl. .......................................... 714/38; 714/37
(58) Field of Search ..................................... 714/37, 38

(56) References Cited

U.S. PATENT DOCUMENTS

| | | | | |
|---|---|---|---|---|
| 6,161,200 A | * | 12/2000 | Rees et al. ..................... | 714/38 |
| 6,279,124 B1 | * | 8/2001 | Brouwer et al. ............... | 714/38 |
| 6,285,976 B1 | * | 9/2001 | Rotbart ......................... | 703/17 |
| 6,587,969 B1 | * | 7/2003 | Weinberg et al. ............. | 714/46 |

OTHER PUBLICATIONS

Yang, C. et al., "All–du–path Coverage for Parallel Programs", presented at the *Assoc. of Computing Manufac. Special Interest Groups on Software Eng.*, ACM SIGSOFT, Int'l Symposium on Software Testing and Analysis, 1998, pp. 1–10.

Marick, B., "Using Race Coverage with GCT", *User Manual of a Generic Coverage Tool (GCT)*, http://www-.mirror.ac.uk/sites/Ftp.cs.uiuic.edu/pub/testing/gct.Files/Ftp.txt., 1992, pp. 1–6.

Factor, M. et al., "Testing Concurrent Programs: A Formal Evaluation of Coverage Criteria", *Proc. Of the 7th Israel Conference on Comp. Systems and Software Eng.*, 1996, pp. 1–13.

* cited by examiner

*Primary Examiner*—Nadeem Iqbal
*Assistant Examiner*—Timothy M. Bonura
(74) *Attorney, Agent, or Firm*—Darby & Darby

(57) ABSTRACT

A method for analyzing software, including defining a plurality of coverage models for testing a non-sequential program responsive to an interleaving of the program, each of the coverage models having a respective coverage level. The plurality of coverage models are then arranged in a hierarchy of increasing coverage level and the program is tested using at least a subset of the coverage models in a sequence according to the hierarchy so as to achieve a predetermined overall level of coverage.

12 Claims, 5 Drawing Sheets

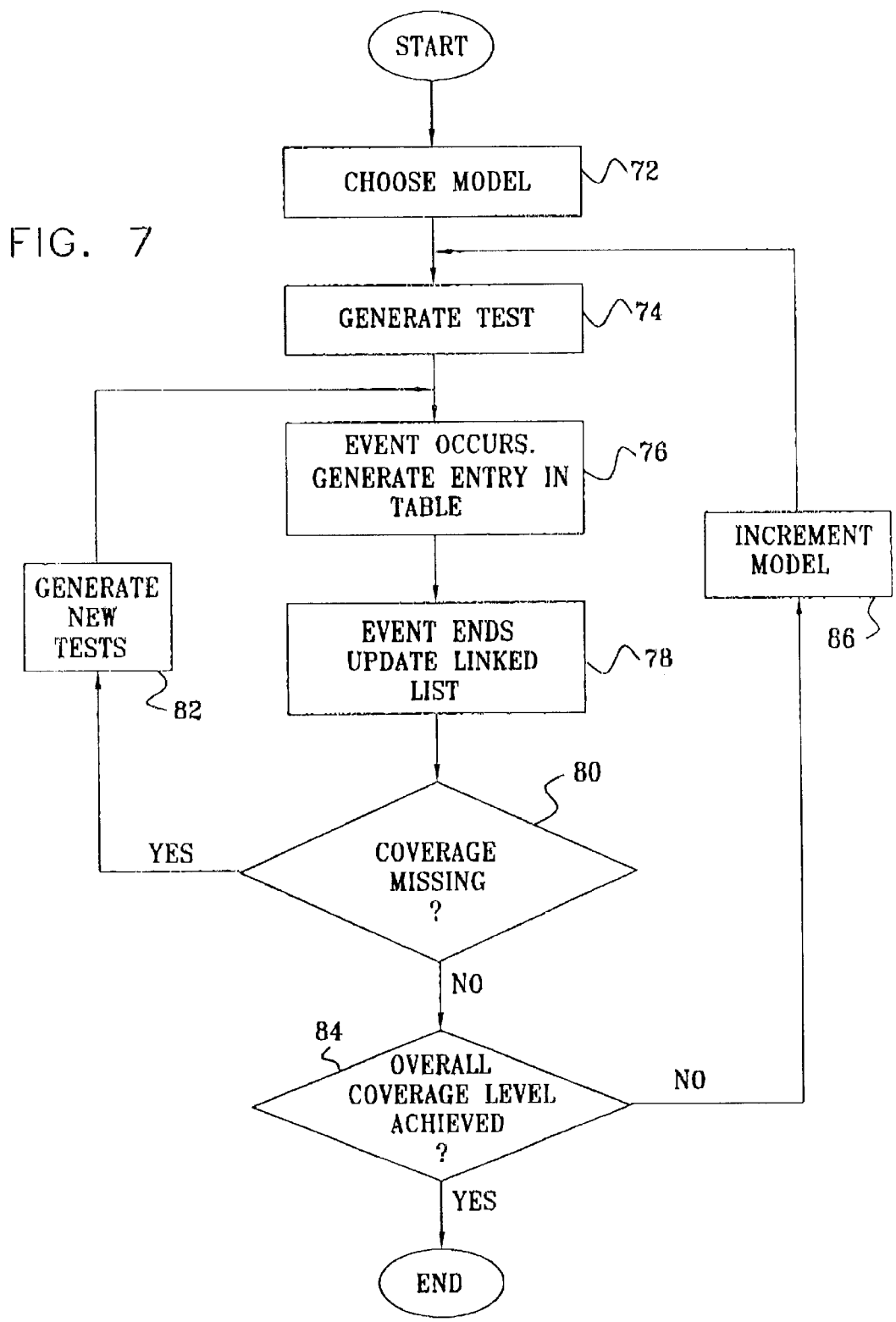

INTERLEAVING BASED COVERAGE MODELS FOR CONCURRENT AND DISTRIBUTED SOFTWARE

CROSS-REFERENCE TO RELATED APPLICATIONS

This application claims the benefit of U.S. Provisional Patent Application No. 60/201,446, filed May 3, 2000 which is assigned to the assignee of the present invention and which is incorporated herein by reference.

FIELD OF THE INVENTION

The present invention relates generally to testing software, and specifically to testing concurrent and/or distributed software.

BACKGROUND OF THE INVENTION

Tests for checking sequential software, i.e., software which runs on one platform and which has only one thread, are well known in the art. The tests are used to give a level of assurance that the software is fault-free, and may also detect and locate faults in the software. The tests vary in their ability to perform these tasks. For example, one may create a set of tests which ensures that every statement in a program has been executed. In this case, however, even successful completion of the tests will not necessarily detect a fault due to a statement which incorrectly defines a value of a variable. In order to detect such a fault, a second test checking and/or setting values of variables may be necessary. In general, whether a particular set of tests on sequential software detects a fault depends on the tests and on values of variables which are used by the tests.

In the context of the present patent application and in the claims, the terms "coverage," "coverage level," and "level of coverage" refer to a metric of completeness with respect to a test or a set of tests. Considering the example above, a test or set of tests may ensure that all statements are executed, in which case these tests provide 100% statement coverage. However, as shown in the example above, tests which provide 100% statement coverage for specific software being tested do not necessarily complete testing coverage for the software in all respects, so that the overall level of coverage of the software may be low.

Coverage analysis defines the concept of a "good set of tests" by formalizing the tests developed to ensure that as many areas of a program as possible are tested, to ensure that the coverage level of each of the areas is known, and to give measures for these coverage levels and for the overall coverage for the program. The purpose of coverage analysis is to direct the sampling process of a set of tests so that the end result is effective in revealing defects. Coverage analysis creates a sequence of testing goals, usually expressed as a hierarchy of coverage requirements, so that achieving each goal marks a higher confidence level in the "correctness" of the program. Thus, when a required overall level of coverage is achieved, we can state with some level of certainty (related to the overall level of coverage) that the software under test is free of defects. Coverage may also be used as a stopping criterion for the testing process, i.e., when a certain level of coverage is achieved testing is stopped.

In the context of the present patent application and in the claims, a "coverage task" denotes a Boolean function on a test, and a "coverage model" denotes a definition of a particular type of coverage which is able to generate a corresponding set of coverage tasks. The outcome of a Boolean function on a test is the result of the function. For example, in a model designed to determine statement coverage of a program, the model will provide a set of outcomes of coverage tasks, such as " . . . , statement 534 was executed in this text, statement 535 was not executed in this test, statement 536 was executed in this test, . . . ."

FIG. 1 is a flowchart that schemtically shows a method for testing software, as is known in the art. In order to test the software, in a first step 10, a set of tests is generated according to predetermined guidelines, such as in the example described above. In a run step 11, the tests are run on the software, and the coverage is estimated. In a check step 12, missing coverage is estimated by comparing a coverage list comprising all possible coverage tasks with the actually covered coverage tasks from the tests. Further tests are performed, in a generate new tests step 13, in order to reduce the missing coverage. The further tests may follow the initial guidelines and/or may comprise further guidelines. The testing procedure concludes when a required level of coverage has been reached.

FIG. 2 is a block diagram schematically showing a process for testing sequential software 16, as is known in the art. Initially, sets of tests 14 are developed which are intended to perform checks 15 corresponding to execute each statement, execute each branch, and execute each define-use relation of the program. The sets of tests are run on the software, with initial inputs from a sample space 17 of all possible inputs for the software. After the tests have been run, software 16 outputs coverage lists 18 of which statements, branches, and define-use relations have been executed. From these lists an estimate of the coverage of the tests can be made. The tests may then be modified to change how the tasks listed above are preformed and/or to choose different inputs from the sample space. The modified tests are run and the process is continued, as described above with reference to FIG. 1, until a required level of coverage is achieved. It will be appreciated that because the sample space of a typical program is in general extremely large or even infinite, it is impossible to run all possible tests on the program.

Testing concurrent and/or distributed programs (CDPs), which comprise a plurality of threads and/or operate on a plurality of distributed platforms, is known to be significantly more complicated than testing sequential software. Whereas in sequential software the result produced by the program is uniquely determined by the inputs selected, in the case of CDPs the result produced depends both on the input space and on the order in which different tasks implemented by the CDP are performed. Thus, in order to determine the result for a specific CDP, additional information in the form of a sequence of schedule decisions in the case of concurrent programs, and/or an order of message arrival in the case of distributed programs, is required. In the context of the present patent application and in the claims, a set of such additional information is termed an "interleaving," and the set of all possible interleavings for a CDP is termed the interleaving space for the CDP. A test on the CDP is of the form (input, interleaving), wherein the interleaving is applied in conjunction with the given input. While a set of tests which covers all possible inputs and all possible interleavings will theoretically detect all defects, such a set cannot be implemented in practice.

Practical methods for testing the CDPs are known in the art. For example, in an article entitled "All-define-use-path Coverage for Parallel Programs" by Cheer-Sun D. Yang et al., presented in the Association of Computing Manufacturer's Special Interest Group on Software Engineering (ACM SIGSOFT), in their International Symposium on Software Testing and Analysis, 1998 (ISSTA 98), which is incorporated herein by reference, the authors suggest applying a define-use coverage criterion to a generalized control-graph of the CDP.

In an article entitled "Testing Concurrent Programs: A Formal Evaluation of Coverage Criteria" by Factor et al., in *Proceedings of the 7th Isreal Conference on Computer Systems and Software Engineering* (1996), which is incorporated herein by reference, the authors describe an adaptation of techniques used for evaluating sequential program coverage criteria to an abstract concurrent language.

Methods for testing CDPs typically look for defects which occur in patterns. For example, access to a common variable by two or more external agents could affect the result of the CDP, depending on which agent accesses the variable first. Thus, a general defect pattern which could cause defects is access to a global common variable.

In a section of a "User Manual of a Generic Coverage Tool (GCT)" entitled "Using Race Coverage with GCT" by Marick, which manual can be found at http://www.mirror.ac.uk/sites/ftp.cs.uiuic.edu/pub/testing/gct.files/ftp.txt, and which is incorporated herein by reference, the author describes testing a concurrent program by investigating a general defect pattern wherein defects are likely to occur if a method can be executed by two threads simultaneously. The program is tested by ensuring that such methods are so executed.

In the context of the present patent application and in the claims, the following definitions apply:

An event is an operation performed by a central processing unit (CPU) which, if its order is changed, might affect an outcome of a CDP being run by the CPU. For example, access to a non-local variable of the CDP is an event, since the order of access to the non-local variable could affect the outcome of the CDP.

An interfering event, also termed herein an interference, is an event which affects the operation of a thread of a CDP. The thread is said to be "interfered with" by the interfering event.

A critical event is an event which might affect a scheduler in a concurrent case (for example by causing it to change an order of operation execution), or an order of message arrival in a distribution case; additionally, a critical event is any interfering event.

An atomic event is a segment of a thread or a process execution which cannot be stopped by a scheduler.

A non-atomic event is a segment of a thread or a process execution which is not atomic, i.e., which can be stopped by the scheduler; a non-atomic event may contain one or more critical events.

SUMMARY OF THE INVENTION

In preferred embodiments of the present invention, a plurality of coverage models are defined. Each model is used to develop one or more tests to be performed on a concurrent and/or a distributed program (CDP). The models are arranged in a plurality of hierarchies of complexity, wherein within each hierarchy the least complex model provides the least extensive coverage and is correspondingly the simplest to implement. Within a hierarchy, as the models increase in complexity, they become increasingly "stronger" in their ability to increase the level of confidence of freedom from defects, since each model includes the coverage of the previous models and adds to this coverage significantly, at the cost of being less simple to implement. Each hierarchy is most preferably utilized by testing sequentially from the least complex model in the hierarchy until a required overall coverage level is achieved. Unlike other methods known in the art for testing CDPs, preferred embodiments of the present invention have all of the following attributes:

Testing is defined directly on an interleaving space of the program.

The coverage models within the plurality of hierarchies are derived from general defect patterns, and so there is a greater chance of uncovering defects.

The plurality of hierarchies comprises coverage models which can each be implemented in practice. Each model in a specific hierarchy is stronger than the previous model.

In some preferred embodiments of the present invention, at least some of the plurality of coverage models comprise interleaving defined on the basis of interference with an event wherein the interleavings are defined in a time-independent manner so that the order of occurrence of interferences for these coverage models is immaterial.

In some preferred embodiments of the present invention, at least some of the plurality of coverage models comprise interleavings defined on the basis of interference with an event wherein the interleavings are defined in a time-dependent manner, so that order of occurrence of interferences is considered. Models so defined are higher in their hierarchy, i.e., give more coverage, than models using time-independent interleavings, since they include the coverage of the lower moldings.

At least some of the plurality of coverage models comprise interleavings combining time-independent and time-dependent interleavings. Models having these combined interleavings are highest in their hierarchy, giving most coverage, compared with other models. In testing a CDP, tests related to the least complex model in a hierarchy are preferably performed first, after which any defects discovered in the tests, which will typically be relatively easy to find, are rectified. Tests related to more complex models, typically comprising tests which are increasingly complex to implement, are then performed. The more complex defects detected by these tests are rectified, and the process of testing and defect rectification continues until a required level of confidence of freedom from defects in the CDP is achieved.

There is therefore provided, according to a preferred embodiment of the present invention, a method for analyzing software, including:

defining a plurality of coverage models for testing a non-sequential program responsive to an interleaving of the program, each of the coverage models having a respective coverage level;

arranging the plurality of coverage models in a hierarchy of increasing coverage level; and testing the program using at least a subset of the coverage models in a sequence according to the hierarchy so as to achieve a predetermined overall level of coverage.

Preferably, the non-sequential program includes a program having a plurality of threads.

Preferably, the non-sequential program includes a program which is implemented on a plurality of central processing units (CPUs).

Further preferably, the interleaving includes a time-independent interference, and defining the plurality of coverage models includes defining at least some models responsive to the time-independent interference.

Alternatively, the interleaving includes a time-dependent interference, and defining the plurality of coverage models includes defining at least some models responsive to the time-dependent interference.

Preferably, the interleaving includes a time-dependent interference and a time-independent interference, and defining the plurality of coverage models includes defining at least some models responsive to the time-dependent interference and the time-independent interference.

Preferably, the interleaving includes one or more events which occur between a pair of sequential synchronization primitives, and defining the plurality of covering models includes defining at least some models responsive to the one or more events.

Preferably, the interleaving includes an m-tuple of interferences, wherein m includes a whole number.

Further preferably, defining the plurality of coverage models includes defining at least some of the coverage models responsive to an input to the non-sequential program.

Preferably, the plurality of coverage models includes a first coverage model and a second coverage model, and the first coverage model includes the second coverage model, so that a first plurality of coverage tasks of the first model includes a second plurality of coverage tasks of the second model.

Preferably, the plurality of coverage models includes a first coverage model defined responsive to a single thread interleaving and a second coverage model defined responsive to a substantially simultaneous interleaving, so that coverage tasks of a third model included in the plurality of models include a Cartesian product of coverage tasks of the first model and the second model.

There is further provided, according to a preferred embodiment of the present invention, apparatus for analyzing software, including a computing system which is adapted to define a plurality of coverage models for testing a non-sequential program responsive to an interleaving of the program, each of the coverage models having a respective coverage level, arrange the plurality of coverage models in a hierarchy of increasing coverage level, and test the program using at least a subset of the coverage models in a sequence according to the hierarchy so as to achieve a predetermined overall level of coverage.

Preferably, the non-sequential program includes a program having a plurality of threads.

Further preferably, the non-sequential program includes a program which is implemented on a plurality of central processing units (CPUs).

Preferably, the interleaving includes a time-independent interference, and the plurality of coverage models includes at least some models defined responsive to the time-independent interference.

Preferably, the interleaving includes a time-dependent interference, and the plurality of coverage models includes at least some models defined responsive to the time-dependent interference.

Further preferably, the interleaving includes a time-dependent interference and a time-independent interference, and the plurality of coverage models includes at least some models defined responsive to the time-dependent interference and the time-dependent interference.

Preferably, the interleaving includes one or more events which occur between a pair of sequential synchronization primitives, and the plurality of coverage models includes at least some models defined responsive to the one or more events.

Preferably, the interleaving includes an m-tuple of interferences, wherein m includes a whole number.

Further preferably, the plurality of coverage models includes at least some of the coverage models defined responsive to an input to the non-sequential program.

Preferably, the interleaving includes a first interleaving and a second interleaving, and the plurality of coverage models includes a first model defined responsive to the first interleaving and a second model defined responsive to the second interleaving, wherein the first interleaving includes the second interleaving, so that a first plurality of coverage tasks of the first model comprises a second plurality of coverage tasks of the second model.

There is further provided, according to a preferred embodiment of the present invention, a computer software product for analyzing software, including a computer-readable medium having computer program instructions recorded therein, which instructions, when read by a computer, cause the computer to define a plurality of coverage models for testing a non-sequential program responsive to an interleaving of the program, each of the coverage models having a respective coverage level, to arrange the plurality of coverage models in a hierarchy of increasing coverage level, and to test the program using at least a subset of the coverage models in a sequence according to the hierarchy so as to achieve a predetermined overall level of coverage.

The present invention will be more fully understood from the following detailed description of the preferred embodiments thereof, taken together with the drawings, in which:

BRIEF DESCRIPTION OF THE DRAWINGS

FIG. 7 is a flowchart showing a method for checking coverage for a concurrent and/or distributed program, according to a preferred embodiment of the present invention.

DETAILED DESCRIPTION OF PREFERRED EMBODIMENTS

Figure 1:
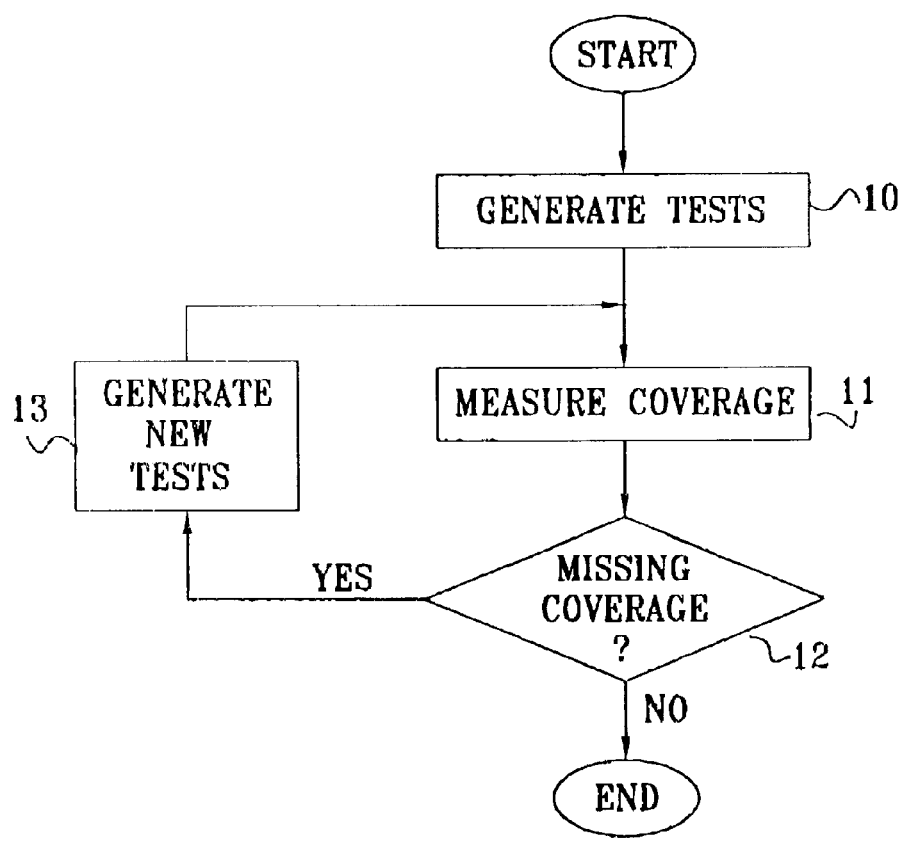
FIG. 1 is a flowchart schematically showing a method for testing software, as is known in the art.
Figure 2:
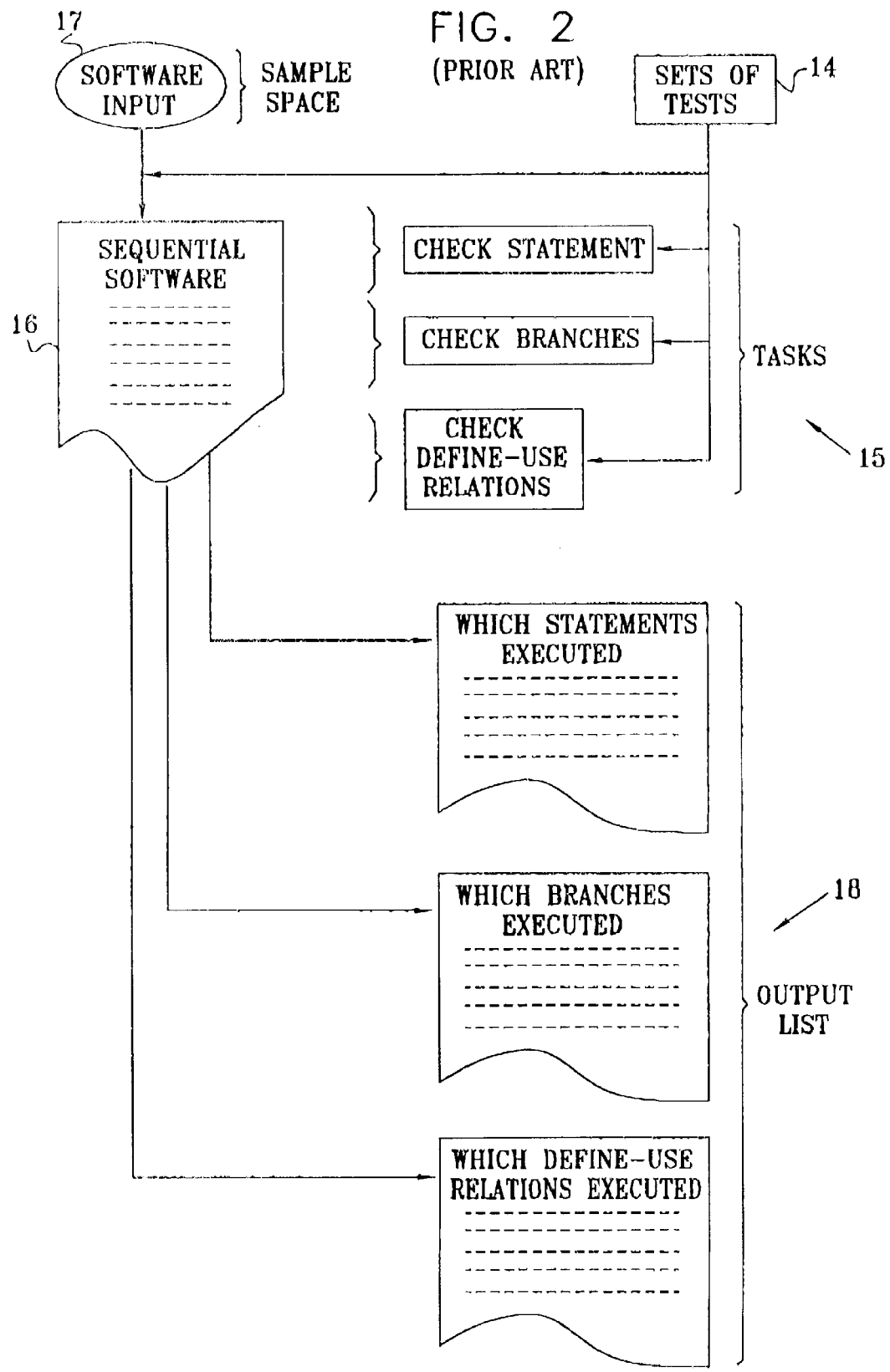
FIG. 2 is a block diagram schematically showing a process for testing sequential software, as is known in the act.
Figure 3:
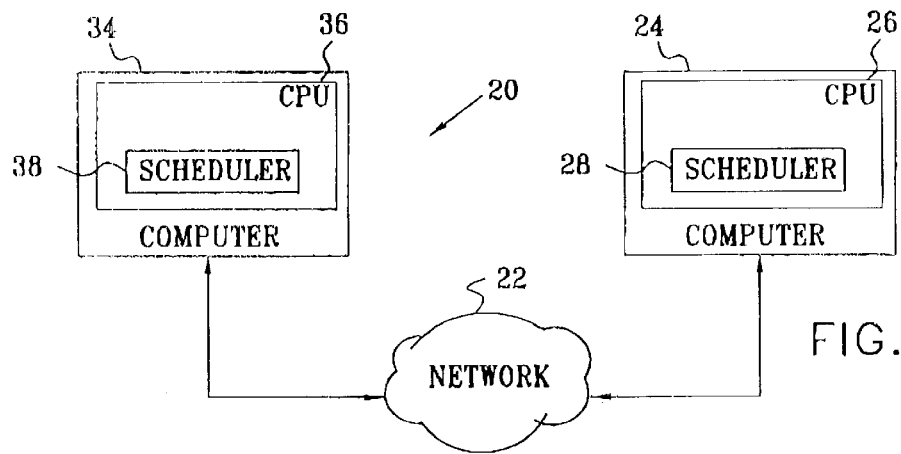
FIG. 3 is a block diagram schematically showing a system for testing a concurrent and/or a distributed program, according to a preferred embodiment of the present invention.

Reference is now made to FIG. 3, which is a block diagram schematically showing a system 20 running a concurrent and/or a distributed program (CDP) under test, according to a preferred embodiment of the present invention. A computer 24 comprises a central processing unit (CPU) 26. A scheduler 28, typically a software function run by the CPU as part of an operating system of computer 24, determines an order for performing instructions from CPU 26 when the computer is running a concurrent program. Another computer 34 similarly comprises a CPU 36 running a scheduler 38, which functions in substantially the same manner as scheduler 28. Computers 24 and 34 are coupled together so that they are able to run a distributed program. For example, computers 24 and 34 are coupled by a network 22, which may be a distributed network or any other form of coupling between the computers, known in the art, which allows the computers to communicate. Computer 24 is able to run a first concurrent program via its scheduler 28; similarly computer 34 is able to run a second concurrent program via its scheduler 38. Hereinbelow, when references are made to a concurrent program, unless otherwise stated the concurrent program is assumed to be run on computer 24, using CPU 26 and scheduler 28.

The software for carrying out the testing/coverage functions described herein can be supplied in electronic form or on tangible media such as a magnetic storage disc or a compact disc which are readable by a computer, or other means known in the art for permanent storage of electronic data.

U.S. patent application Ser. No. 09/327,379, filed Jun. 8, 1999, titled "A Timing Related Hug Detector, to Azagury et al., whose disclosure is assigned to the assignee of the present invention and which is incorporated herein by reference, describes a method for detecting data races between parallel structures in a CDP. The method involves coupling a private scheduler to an operating system, running the CDP for some cycles, and logging and comparing results of each cycle until substantially every possible interleaving of a defined type has been tested.

Figure 4:
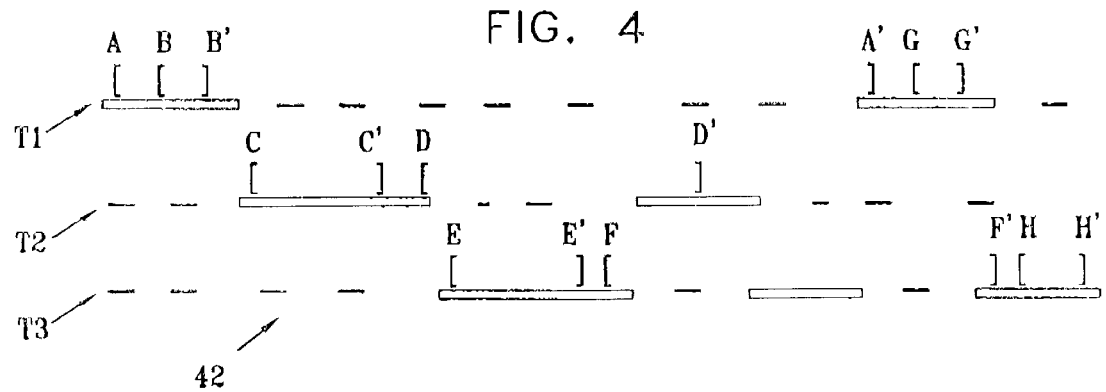
FIG. 4 is a graph that schematically shows activity involved in executing a computer program under test, according to a preferred embodiment of the present invention.

FIG. 4 is a graph that schematically shows activity of CPU 26 in running a computer program under test in system 20, according to a preferred embodiment of the present invention. The program in the present embodiment comprises a multithreaded program run by CPU 26. Optionally, the program comprises a distributed program run by a plurality of CPUs, such as CPU 26 and CPU 36, operating in parallel. It will be understood that if the program runs as a distributed program on a plurality of CPUs, threads run by the program could overlap in time, unlike threads run by a single CPU, as shown in FIG. 4.

Critical, atomic, and non-atomic events are defined in the Background of the Invention. In general, critical events are the events required to be repeated, when running of a CPU is repeated, in order for the rerun of the program to behave substantially as the initial run. The critical events should be repeated with substantially the same timing as in the initial run. For the Java programming language, examples of critical events for a concurrent program include:

A write or read to a shared variable;

A new thread created and run; and

A 'sleeping' thread obtains control due to a context switch.

Examples of critical events for a distributed program include:

A message send; and

A message receive.

An example of an atomic event is reading a simple variable. Examples of non-atomic events are executing of a routine or method. It will be appreciated that while an atomic event may comprise at most one critical event, a non-atomic event may comprise one or more critical events.

In a test run of the paragraph illustrated in FIG. 4, lines T1, T2, and T3 indicate three threads run by the program. Each thread of the program comprises a number of methods 42 invoked by the program during the test. Each method N comprised in methods 42 is represented by the notation N[N'], wherein N[ and N'] correspond respectively to initialization and termination of the method N, and each method N is assumed to be a non-atomic event.

A first coverage model, herein termed coverage model I, captures whether a non-atomic event was interfered with by any critical event. Coverage model I counts the number of interruptions by critical events, and the model is the simplest model in the plurality of models described herein. A general notation for an outcome of model I is <Non-atomic Event, Number of Interruptions>.

A specific example of coverage which is checked according to model I is <method, number of switches to a different thread while the method runs>, wherein the number of switches is classified as 0, 1 or >1. In FIG. 4, method A is interrupted by a thread switch to thread T2 (twice) and also by a thread switch (twice) to thread T3. Thus, a coverage task, i.e., an outcome, under the specific example of model I defined above is <A, <1>. Inspection of FIG. 4 shows that other coverage tasks for this example are: {<B, 0>, <G, 0>; <C, 0>, <D, 1>; <E, 0>, <F, >1>, <H, 0>}. A theoretical coverage list of all possible coverage tasks for this example, assuming methods A, B, . . . , H are all the methods used in the program, is given in Table I hereinbelow:

TABLE I

| <A, 0> | <A, 1> | <A, >1> | <B, 0> | <B, 1> | <B, >1> |
| <C, 0> | <C, 1> | <D, >1> | <D, 0> | <D, 1> | <D, >1> |
| <E, 0> | <E, 1> | <F, >1> | <F, 0> | <F, 1> | <F, >1> |
| <G, 0> | <G, 1> | <H, >1> | <H, 0> | <H, 1> | <H, >1> |

In order to achieve full coverage under model I, it is necessary to run more tests, since full coverage of model I requires that each item in Table I be an actual coverage task in the tests. It will be appreciated that a size of a coverage list for model I is O(n), i.e., of the order of n, where n is the number of events under consideration. The interleaving for model I may be any type of interference with the event, not just the specific interference described with respect to the example hereinabove. Furthermore, for each type of coverage defined for model I, a coverage list similar to Table I can be generated so that as tests are performed, the fraction of coverage achieved can be measured.

A second coverage model, herein termed coverage model II, captures whether a non-atomic event interferes with another non-atomic event. Coverage model II lists the interferences, with a general notation <Non-atomic Event, Non-atomic Event>, caused by a specific interfering mechanism. Examples by which non-atomic events can interfere with each other are:

A message is sent by one non-atomic event and is received by another non-atomic event.

A mutual shared variable is accessed by both non-atomic events.

A synchronization primitive, e.g., wait( ) or notify( ), is executed by both non-atomic events on the same class.

A specific example of coverage which is checked according to model II is <method, method> where the interfering mechanism is assumed to be two methods running on different threads at the same time. For the program of FIG. 4, comprising methods A, B, C, D, E, F, G, and H, a complete coverage list of all theoretically possible coverage tasks under model II is given in Table II hereinbelow:

TABLE II

| | | | | | | | |
|---|---|---|---|---|---|---|---|
| <A,B> | <A,C> | <A,D> | <A,E> | <A,F> | A,G> | <A,H> | <B,C> |
| <B,D> | <B,E> | <B,F> | <B,G> | <B,H> | <C,D> | <C,E> | <C,F> |
| <C,G> | <C,H> | <D,E> | <D,F> | <D,G> | <D,H> | <E,F> | <E,G> |
| <E,H> | <F,G> | <F,H> | <G,H> | | | | |

The following are coverage tasks for the test shown in FIG. 4:

<A, C>, <A, D>, <A, E>, <A, F>;

<D, E>, <D, F>;

<F, G>.

In order to achieve more complete coverage for this specific example of model II, i.e., to realize more of the coverage tasks listed in Table II, more tests need to be run on the program.

Other interfering mechanisms between events can be defined, for example:

A message is sent by a first event and received by a second event.

A mutual shared variable is accessed by a first and a second event.

A synchronization primitive, e.g., wait( ) or notify( ), is executed by a first and a second event on the same class.

Other examples of interfering mechanisms will be apparent to those skilled in the art.

The size of a coverage list for model II is $O(n^2)$, i.e., of the order of $n^2$, wherein n is the number of events under consideration. Thus, model II typically generates a larger number of possible coverage tasks than does model I. In addition, model II is stronger than model I, since it includes the coverage provided by model I. Thus, in the example above illustrating model I, checks were made simply as to whether a context switch occurred, and into which class (0, 1, <1) the number of switches should be placed. In the case of the example above illustrating model II, the interference mechanism is detailed, and all the possible pairs of events that can interfere by this mechanism are included.

Although the example described hereinabove with respect to Table II applies to pairs of interfering events, the method of model II can also be applied to triples <Non-atomic Event, Non-atomic Event, Non-atomic Event> according to a specific interfering mechanism. In general, the method can be applied to m-tuples of events according to a specific interfering mechanism, where m is a whole number, in which case a size of a coverage list for model II is $O(n^m)$.

Models I and II comprise a coverage hierarchy of models which provide increasing coverage of a CDP. Thus, after tests generated according to model I have been made on the CDP, defects located in the CDP are remedied. The CDP is then subjected to tests generated according to model II, and defects located thereby, which will typically not be located by the model I tests, are remedied. It will be understood that the hierarchy of models I and II can be applied to one or more subsets of classes within a specific program, by looking for interfering events, or pairs, triples, etc., of events, within classes. Similarly, the hierarchy of models described hereinbelow can be applied to one or more subsets of classes within a specific program.

Models I and II comprise coverage criteria which check for defects resulting from an interleaving due to interference in non-atomic events. Interleavings in models I and II are not dependent on an order of occurrence of the defined interleavings, so that these interleavings may be considered to be time-independent. In the models described hereinbelow, the interleaving is defined based on an order of execution of critical events defining atomic events, so that these models comprise a time element, either implicitly or explicitly. Such critical events, occurring at the beginning and at the end of each atomic event, are herein termed critical points.

Figure 5:
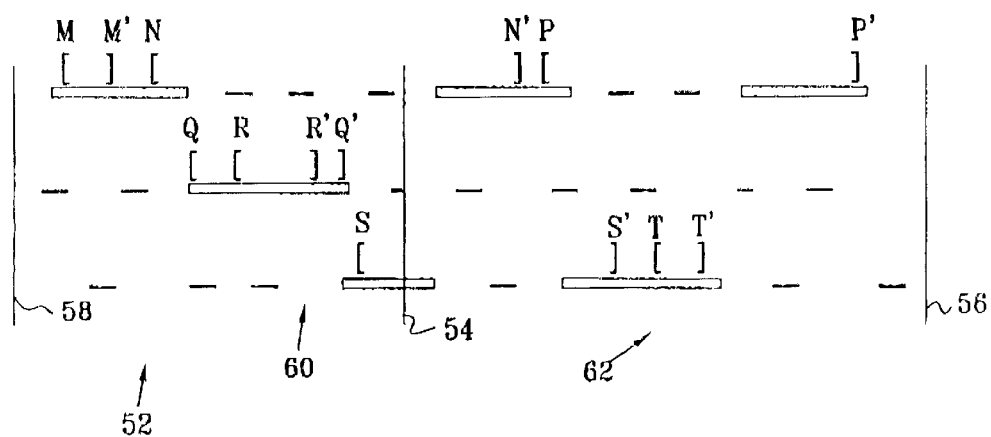
FIG. 5 is a graph that schematically shows activity involved in executing another computer program under test, according to a preferred embodiment of the present invention.

FIG. 5 is a schematic graph showing activity of CPU 26 in running about multithreaded computer program under test, according to a preferred embodiment of the present invention. Optionally, the program comprises a distributed program run by a plurality of CPUs, such as CPU 26 and CPU 36, operating in parallel. As in FIG. 4, lines T1, T2, and T3 indicate three threads run by the program, each thread comprising a number of non-atomic events 52 invoked by the program during the test. Each non-atomic event 52 is represented by N{N'}, where N is a non-atomic event descriptor, N[corresponds to initialization of non-atomic event N, and N'] corresponds to termination of non-atomic event N. Thus, N[and N'] are examples of atomic events corresponding to critical points.

A model III is defined as a model which covers all critical points, taken singly, for a single thread. Thus, for thread T1 the coverage tasks are {M, M', N, N', P, P'}. A size of the coverage tasks for model III is O(CP), where CP represents the number of critical points in the program under test.

A model IV is defined as a model which covers all pairs of consecutive critical points which occur on a single thread. Thus for the activity of the program shown in FIG. 5, the coverage task is {(M, M'), (M', N), (N, N'), (N', P), (P, P'), (Q, R), (R, P'), (R', Q'), (S, S'), (S', T), (T, T')}. The theoretical total possible coverage tasks for model IV are {(X, Y)| X is a critical point, Y is a critical point on the same thread as X, occurring after X}. In practice, some atomic events can occur only after other atomic events have already occurred, which reduces the total number of possible coverage tasks. Static analysis of a specific program can give some information as to which sequences of atomic events are possible. It will be appreciated, however, that model IV gives larger coverage than model III, having a size equal to $O(CP^2)$. Extensions of model IV comprise m-tuples of consecutive critical points which occur on a single thread, wherein m is a whole number, and wherein the size of the coverage list is $O(CP^m)$. In general, the number of coverage tasks generated by model IV is greater than the number generated by model III, and in order to fulfil coverage tasks for model IV those for model III must be covered, so that model IV is higher in the coverage hierarchy.

Models III and IV comprise coverage which captures flow control of critical points on a single thread. In models V and VI described hereinbelow, the models capture critical points which occur substantially simultaneously.

Lines 58, 54, and 56 in FIG. 5 represent times at which a synchronization primitive is implemented. Critical points which occur between lines 58 and 54, i.e., during a first time period 60, are considered to occur substantially simultaneously. Similarly, critical points which occur between lines 54 and 56, during a second time period 62, are also considered to occur substantially simultaneously. Time period 60 and time period 62 comprise regions in which, for a concurrent program, at most one thread can be in control at any one time.

Model V is defined as a model which covers all pairs of critical points which occur simultaneously and wherein the critical points are on different threads. Thus the coverage tasks for model V coverage during first time period 60 comprise {(M, Q), (M, R), (M, R'), (M, Q'), (M, S), (M', Q), (M', R), (M', R'), (M', Q'), (M', S), (N, Q), (N, R), (N, R'), (N, Q'), (N, S), (Q, S), (R, S), (R', S), (Q', S)}. The coverage tasks for second time period 62 comprise {(N', S'), (N', T), (N', T'), (P, S'), (P, T), (P, T'), (P', S'), (P', T), (P', T')}. The theoretical possible coverage tasks for model V are {(X, Y), X is a critical point, Y is a critical point occurring simultaneously with X on a different thread from X}. While some members of this set do not exist in practice, the coverage list for model V is larger than the coverage list for model III, and includes the coverage of model III. A size "x" of the coverage list for model V is $O(CP) < x < O(CP^2)$.

Model VI is defined as a model which covers all m-tuples of critical points that occur simultaneously and wherein the critical points are on different threads, where m is a whole number. For the case of m=3, the coverage tasks for model VI coverage for first time period 60 comprises {(M, Q, S), (M, R, S), (M, R', S), (M, Q', S), (M', Q, S), (M', R, S), (M', R', S), (M', Q', S), (N, Q, S), (N, R, S), (N, R', S), (N, Q', S)}. The total possible coverage tasks for model VI for m=3 is {(X, Y, Z) X is a critical point, Y is a critical point, Z is a critical point, X, Y, Z occur simultaneously on different threads}. The coverage list for model VI, equal to a size $O(CP^m)$, is larger than the coverage list for model V, and the coverage of model VI includes that of model V. (The number of coverage tasks listed above for the example of the 3 threads of FIG. 5 is fewer than those for model V. However, when the number of threads is larger, the coverage task relationships stated above and the size of coverage lists relationships agree.)

In a model VII and a model VIII, described in more detail hereinbelow, the coverage is defined as Cartesian product combinations of the coverage of model IV with model V, and of model IV with model VI, respectively. In both cases, the combination comprises coverage tasks, with consecutive and simultaneous properties.

Model VII is defined as a model which combines the coverage of models IV and V. Thus an outcome for model VII is applied to the example of FIG. 5 is ((M, M'), (M, Q)). Those skilled in the art will be able to generate other outcomes of model VII as applied to FIG. 5. The coverage supplied by model VII is greater and stronger than that provided by models IV and V defined hereinabove.

Model VIII is defined as a model which combines the coverage of models IV and VI. Thus an outcome for model VIII as applied to the example of FIG. 5 is ((M, M'), (M, Q, S)). Those skilled in the art will similarly be able to generate other outcome of model VIII as applied to FIG. 5. The coverage supplied by model VIII is greater and stronger than that provided by models IV and VI defined hereinabove.

Figure 6:
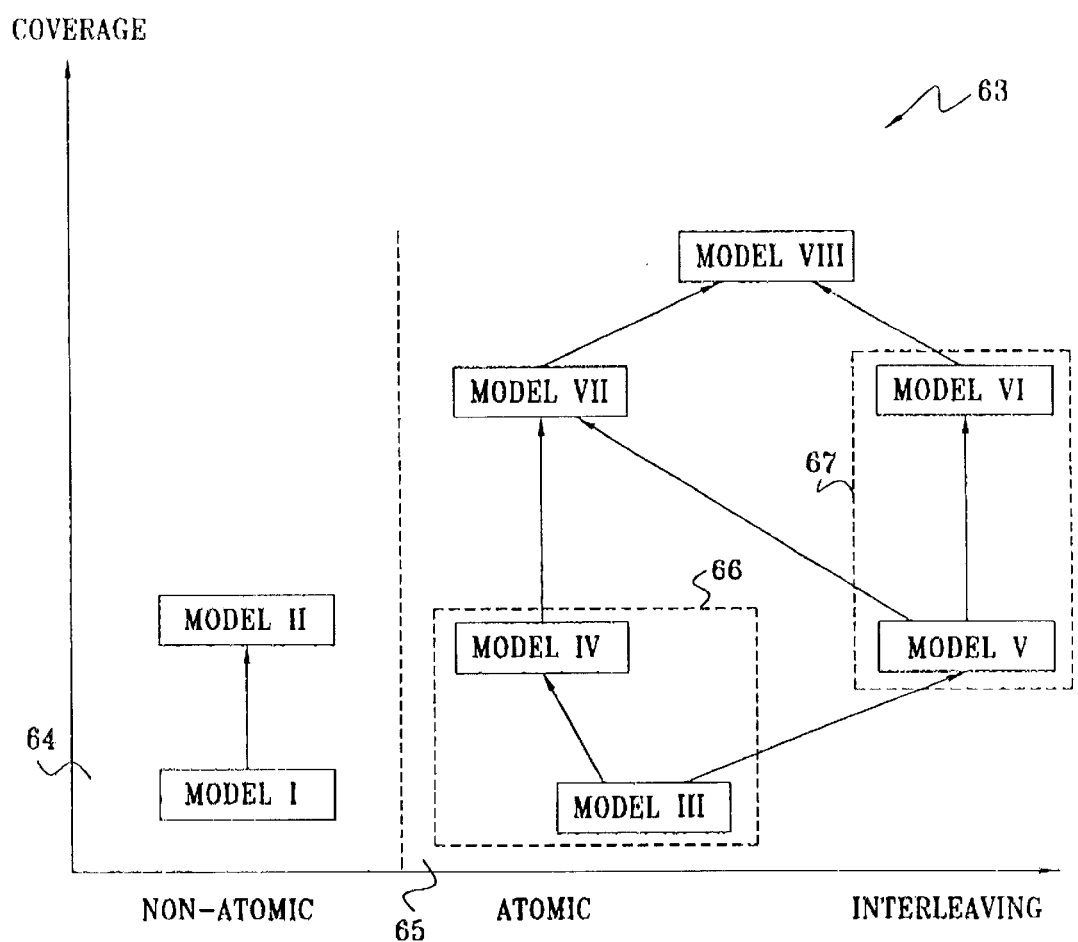
FIG. 6 is a schematic graph showing relationships between coverage models described with reference to FIGS. 3–5, according to a preferred embodiment of the present invention.

FIG. 6 is a schematic graph 63 showing relationships between the models described hereinabove, according to a preferred embodiment of the present invention. Graph 63 illustrates relationships according to coverage and type of interleaving. In a region 64, a first hierarchy, comprising models I and II, shows increasing coverage for interleavings of non-atomic events. In a region 65, a second hierarchy, comprising models III–VIII, shows increasing coverage for interleavings of atomic events. Within region 65, region 66 corresponds to interleavings defined for a single thread, region 67 corresponds to interleavings defined for a plurality of threads. Either or both hierarchies may be used to test a CDP.

While it is theoretically possible to test a CDP with only model II or only model VIII, achieving highest coverage in each hierarchy in "one step," it is inefficient to do so, because of the size of the coverage list of the model. It is more efficient to use lower coverage models initially, because of the reduced size of their coverage lists. More preferably, whichever defects can be eliminated with these models are eliminated, and then the hierarchy of models is proceeded through until a required level of confidence of freedom from defects is achieved.

FIG. 7 is a flowchart showing a method for checking coverage of a concurrent and/or distributed program, according to a preferred embodiment of the present invention. In a first step 72 one of the coverage models of one of the hierarchies described hereinabove is chose, preferably model I or model III, and in a test generation step 74 one or more tests corresponding to the model are generated, by methods known to those skilled in the art. In preparation for the test procedure, a general object, comprising a table, is defined. The table is updated during the course of the tests, and is used to track coverage. Specifically, in an event start step 76, when an event relevant to the chosen model starts to execute, the following entry is generated in the table:

[Unique Identity; Name of critical, atomic, or non-atomic event; a pointer to a linked list]

where "Unique Identity" is an identifier of the table entry, and the linked list is a list in which information of interest concerning the event of the entry is written.

Events interfering with the event of the entry are then tracked. Every time the event of the entry ends, in an event conclude step 78, the linked list is updated. The linked list comprises information relevant to the event of the entry. For example, if a thread switch occurs during the execution of a first method, and a different method is executed by another thread, the interfering thread and/or method, depending on the coverage model, is added to the linked list. If the order of the thread context switch is needed, the list is updated each time a context switch occurs. If only the number of context switches is needed, a counter in the list is used.

The table is used to deduce the coverage provided by the test. In a coverage check step 80, coverage is checked and if coverage is missing, further tests are generated in a generate new tests step 82. The process continues until a satisfactory coverage level for the chosen model is achieved.

Once satisfactory coverage for the chosen model has been achieved, this coverage level is checked against an overall coverage requirement. If the required overall coverage for the program has not been achieved, in overall coverage steps 84 and 86 a next model in the hierarchy is chose, and steps 72, 64, 76, 80, and 82 are repeated. The process continues until a required overall coverage for the program has bene reached, after which the process terminates.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for analyzing software, comprising:

defining a plurality of coverage models for testing an on-sequential program responsive to an interleaving of the program, each of the coverage models having a respective coverage level; arranging the plurality of coverage models in a hierarchy of increasing coverage level; and testing the program using at least a subset of the coverage models in a sequence according to the hierarchy so as to achieve a predetermined overall level of coverage, wherein the interleaving comprises a time-independent interference, and wherein defining the plurality of coverage models comprises defining at least some models responsive to the time-independent interference.

2. A method for analyzing software, comprising:

defining a plurality of coverage models for testing a non-sequential program responsive to an interleaving of the program, each of the coverage models having a respective coverage level;

arranging the plurality of coverage models in a hierarchy of increasing coverage level; and testing the program using at least a subset of the coverage models in a sequence according to the hierarchy so as to achieve a predetermined overall level of coverage, wherein the interleaving comprises a time-dependent interference, and wherein defining the plurality of coverage models comprises defining at least some models responsive to the time-dependent interference.

3. A method for analyzing software, comprising:

defining a plurality of coverage models for testing a non-sequential program responsive to an interleaving of the program, each of the coverage models having a respective coverage level;

arranging the plurality of coverage models in a hierarchy of increasing coverage level; and testing the program using at least a subset of the coverage models in a sequence according to the hierarchy so as to achieve a predetermined overall level of coverage, wherein the interleaving comprises a time-dependent interference and a time-independent interference, and wherein defining the plurality of coverage models comprises defining at least some models responsive to the time-dependent interference and the time-independent interference.

4. A method for analyzing software, comprising:

defining a plurality of coverage models for testing a non-sequential program responsive to an interleaving of the program, each of the coverage models having a respective coverage level;

arranging the plurality of coverage models in a hierarchy of increasing coverage level; and testing the program using at least a subset of the coverage models in a sequence according to the hierarchy so as to achieve a predetermined overall level of coverage, wherein the interleaving comprises one or more events which occur between a pair of sequential synchronization primitives, and wherein defining the plurality of coverage models comprises defining at least some models responsive to the one or more events.

5. A method for analyzing software, comprising:

defining a plurality of coverage models for testing a non-sequential program responsive to an interleaving of the program, each of the coverage models having a respective coverage level;

arranging the plurality of coverage models in a hierarchy of increasing coverage level; and testing the program using at least a subset of the coverage models in a sequence according to the hierarchy so as to achieve a predetermined overall level of coverage, wherein the interleaving comprises m-tuple of interferences, wherein m comprises a whole number.

6. A method for analyzing software, comprising:

defining a plurality of coverage models for testing a non-sequential program responsive to an interleaving of the program, each of the coverage models having a respective coverage level;

arranging the plurality of coverage models in a hierarchy of increasing coverage level; and testing the program using at least a subset of the coverage models in a sequence according to the hierarchy so as to achieve a predetermined overall level of coverage, wherein the plurality of coverage models comprises a first coverage model defined responsive to a single thread interleaving and a second coverage model defined responsive to a substantially simultaneous interleaving, so that coverage tasks of a third model comprised in the plurality of models comprises a Cartesian product of coverage tasks of the first model and the second model.

7. Apparatus for analyzing software, comprising a computing system which is adapted to define a plurality of coverage models for testing a non-sequential program responsive to an interleaving of the program, each of the coverage models having a respective coverage level, arrange the plurality of coverage models in a hierarchy of increasing coverage level, and test the program using at least a subset of the coverage models in a sequence according to the hierarchy so as to achieve a predetermined overall level of coverage, wherein the interleaving comprises a time-independent interference, and wherein the plurality of coverage models comprises at least some models defined responsive to the time-independent interference.

8. Apparatus for analyzing software, comprising a computing system which is adapted to define a plurality of coverage models for testing a non-sequential program responsive to an interleaving of the program, each of the coverage models having a respective coverage level, arrange the plurality of coverage models in a hierarchy of increasing coverage level, and test the program using at least a subset of the coverage models in a sequence according to the hierarchy so as to achieve a predetermined overall level of coverage, wherein the interleaving comprises a time-dependent interference, and wherein the plurality of coverage models comprises at least some models defined responsive to the time-dependent interference.

9. Apparatus for analyzing software, comprising a computing system which is adapted to define a plurality of coverage models for testing a non-sequential program responsive to an interleaving of the program, each of the coverage models having a respective coverage level, arrange the plurality of coverage models in a hierarchy of increasing coverage level, and test the program using at least a subset of the coverage models in a sequence according to the hierarchy so as to achieve a predetermined overall level of coverage, wherein the interleaving comprises a time-dependent interference and a time-independent interference, and wherein the plurality of coverage models comprises at least some models defined responsive to the time-dependent interference and the time-independent interference.

10. Apparatus for analyzing software, comprising a computing system which is adapted to define a plurality of coverage models for testing a non-sequential program responsive to an interleaving of the program, each of the coverage models having a respective coverage level, arrange the plurality of coverage models in a hierarchy of increasing coverage level, and test the program using at least a subset of the coverage models in a sequence according to the hierarchy so as to achieve a predetermined overall level of coverage, wherein the interleaving comprises one or more events which occur between a pair of sequential synchronization primitives, and wherein the plurality of coverage models comprises at least some models defined responsive to the one or more events.

11. Apparatus for analyzing software, comprising a computing system which is adapted to define a plurality of coverage models for testing a non-sequential program responsive to an interleaving of the program, each of the coverage models having a respective coverage level, arrange the plurality of coverage models in a hierarchy of increasing coverage level, and test the program using at least a subset of the coverage models in a sequence according to the hierarchy so as to achieve a predetermined overall level of coverage, wherein the interleaving comprises an m-tuple of interferences, wherein m comprises a whole number.

12. Apparatus for analyzing software, comprising a computing system which is adapted to define a plurality of coverage models for testing a non-sequential program responsive to an interleaving of the program, each of the coverage models having a respective coverage level, arrange the plurality of coverage models in a hierarchy of increasing coverage level, and test the program using at least a subset of the coverage models in a sequence according to the hierarchy so as to achieve a predetermined overall level of coverage, wherein the interleaving comprises a first interleaving and a second interleaving, and wherein the plurality of coverage models comprises a first model defined responsive to the first interleaving and a second model defined responsive to the second interleaving, and wherein the first interleaving comprises the second interleaving, so that a first plurality of coverage tasks of the first model comprises a second plurality of coverage tasks of the second model.

* * * * *